United States Patent
Trika et al.

(10) Patent No.: US 7,797,479 B2
(45) Date of Patent: Sep. 14, 2010

(54) TECHNIQUE TO WRITE TO A NON-VOLATILE MEMORY

(75) Inventors: Sanjeev N. Trika, Hillsboro, OR (US);
Robert W. Faber, Hillsboro, OR (US);
Rick Coulson, Portland, OR (US);
Jeanna N. Matthews, Massena, NY (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 11/172,608

(22) Filed: Jun. 30, 2005

(65) Prior Publication Data

US 2007/0005928 A1 Jan. 4, 2007

(51) Int. Cl.
*G06F 13/00* (2006.01)
*G06F 13/28* (2006.01)
*G06F 9/26* (2006.01)
*G06F 9/34* (2006.01)

(52) U.S. Cl. ............... 711/103; 711/202; 711/E12.103

(58) Field of Classification Search .............. 711/202, 711/E12.103, 103
See application file for complete search history.

(56) References Cited

U.S. PATENT DOCUMENTS

| 5,566,314 | A | 10/1996 | DeMarco et al. | |
| 5,630,093 | A | 5/1997 | Holzhammer et al. | ........ 395/442 |
| 2002/0099904 | A1* | 7/2002 | Conley | ........................ 711/103 |
| 2003/0101327 | A1 | 5/2003 | Beck | |
| 2003/0163594 | A1 | 8/2003 | Aasheim et al. | |
| 2003/0189860 | A1* | 10/2003 | Takeuchi et al. | ............ 365/200 |
| 2004/0168018 | A1* | 8/2004 | Aasheim et al. | ............. 711/103 |

FOREIGN PATENT DOCUMENTS

WO    WO 02/058074    7/2002

* cited by examiner

*Primary Examiner*—Sheng-Jen Tsai
*Assistant Examiner*—Edward J Dudek, Jr.
(74) *Attorney, Agent, or Firm*—Trop, Pruner & Hu, P.C.

(57) ABSTRACT

A technique includes performing a plurality of write operations to store data in different physical memory locations. Each of the physical memory locations are associated with a logical address that is shared in common among the physical addresses. The technique includes storing sequence information in the physical memory locations to indicate which one of the write operations occurred last.

24 Claims, 8 Drawing Sheets

TECHNIQUE TO WRITE TO A NON-VOLATILE MEMORY

BACKGROUND

The invention generally relates to a technique to write to a non-volatile memory.

Non-volatile semiconductor memories, such as flash memories, are attractive for applications in which data is to be preserved in the event of a normal system shutdown/hibernation or power failure. Thus, a memory that is formed from flash memory devices may be used to store data in a disk cache or a solid state disk. Although a typical flash memory has a significantly faster access time than a magnetic storage device, unlike the magnetic storage device, the cells of the flash memory typically cannot be re-written without first being erased.

As a more specific example, before a bit of data is stored in a conventional flash memory cell, the cell is first erased. In this erased state, the cell is indicative of a particular logic state, such as a logic "one" state, for example. In a subsequent write operation to the flash memory cell, if a logic one is to be stored in the cell, then the state of the cell remains unchanged. However, if a logic zero is to be stored in the cell, then the cell is programmed to change the cell to a zero logic state. Thus, a typical write to a flash memory cell typically involves two memory operations: a first operation to erase the memory cell; and a second operation to program the logic state of the memory cell. These multiple operations, in turn, contribute to the overall time to write to the flash memory.

Thus, there exists a continuing need for better ways to reduce the overall time to write to a non-volatile semiconductor memory, such as a flash memory, for example.

DETAILED DESCRIPTION

In accordance with embodiments of the invention described herein, dynamic addressing is used in connection with a non-volatile semiconductor memory (herein called a "non-volatile memory") for purposes of minimizing the write latency of the memory. More specifically, in accordance with embodiments of the invention that are described herein, the non-volatile memory is, from a software standpoint, addressed using logical addresses. From the standpoint of the physical read and write operations that are performed with the memory, the dynamic addressing translates, or maps, the logical addresses to physical addresses of the memory. The dynamic addressing continually changes the mapping between the logical and physical addresses to ensure that each logical write operation causes data to be stored in a previously erased location (i.e., at a different physical address) of the non-volatile memory. Thus, with dynamic addressing, each logical write operation produces a single operation. This is to be compared to dynamic addressing that uses two accesses to non-volatile memory (one to erase/invalidate the old physical location, and the other to write the data at the new pre-erased physical location).

Figure 1:
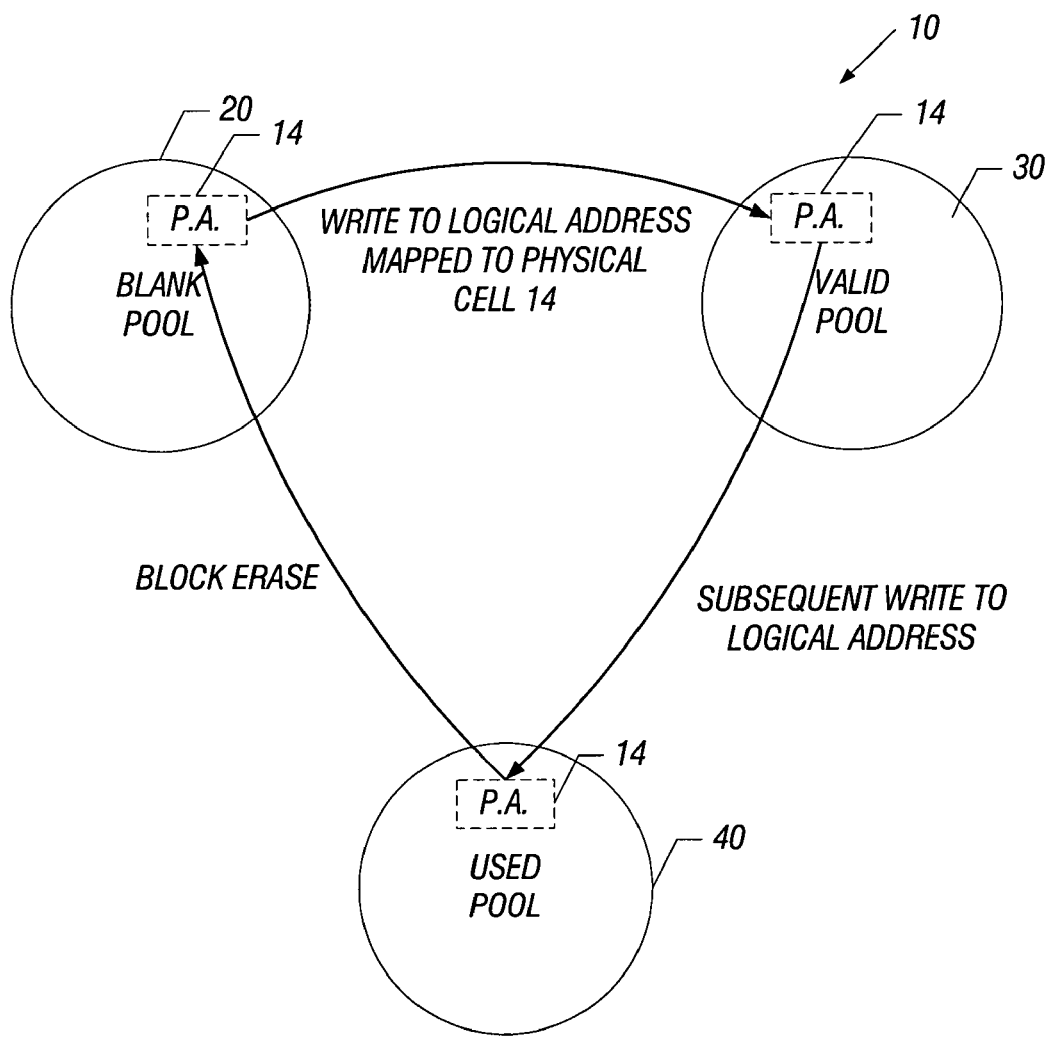
FIG. 1 is an illustration of a dynamic addressing scheme used with a non-volatile semiconductor memory according to an embodiment of the invention.

More specifically, referring to FIG. 1, in accordance with some embodiments of the invention, a dynamic addressing scheme 10 groups the physical addresses of a non-volatile memory into blank 20 valid 30 and used 40 pools. The blank pool 20 represents the unassigned physical addresses whose associated memory cells are erased, are ready to be programmed and thus, are ready to be assigned to logical addresses. The valid pool 30 represents physical addresses that are associated with memory cells that store valid data and are assigned to logical addresses. The used pool 40 represents the physical addresses that no longer store valid data, are no longer associated with logical addresses and are to be erased. The physical addresses of the used pool 40 are regrouped into the blank pool 20 when block erase operations are used to erase contiguous blocks (pages, for example) of physical addresses. It is noted that the block erase is more efficient than erasing the physical addresses one at a time in response to each logical write operation, and additionally, the non-volatile memory (such as a NAND flash memory, for example) may only permit block erases.

As a more specific example, an exemplary physical address 14 (associated with a set of memory cells, or memory location) of the non-volatile memory may transition between the blank 20, valid 30 and used 40 pools in the following manner. Initially, such as at startup of the system that incorporates the non-volatile semiconductor memory or after being erased, the physical address 14 belongs to the blank pool 20. In other words, by virtue of being in the blank pool 20, the physical address 14 is available for assignment to a particular logical address. Thus, when data is written to a particular logical address, the physical address 14 is assigned to the logical address so that the data is stored at the physical address 14; and the physical address 14 then becomes part of the valid pool 30. Another write to the physical address 14, however, cannot occur without the memory cells that are associated with the physical address 14 being erased. Therefore, when the next write occurs to the same logical address, another physical address is assigned to the logical address, and the memory content that is associated with the physical address 14 becomes invalid, or "used," as the physical address 14 becomes part of the used pool 40.

The memory cells associated with the physical address 14 are not necessarily immediately erased upon becoming "used," but rather, these memory cells are erased in a block erase operation. At this time, the physical address 14 once again becomes part of the blank pool 20 and may be assigned to another logical address.

Figure 2:
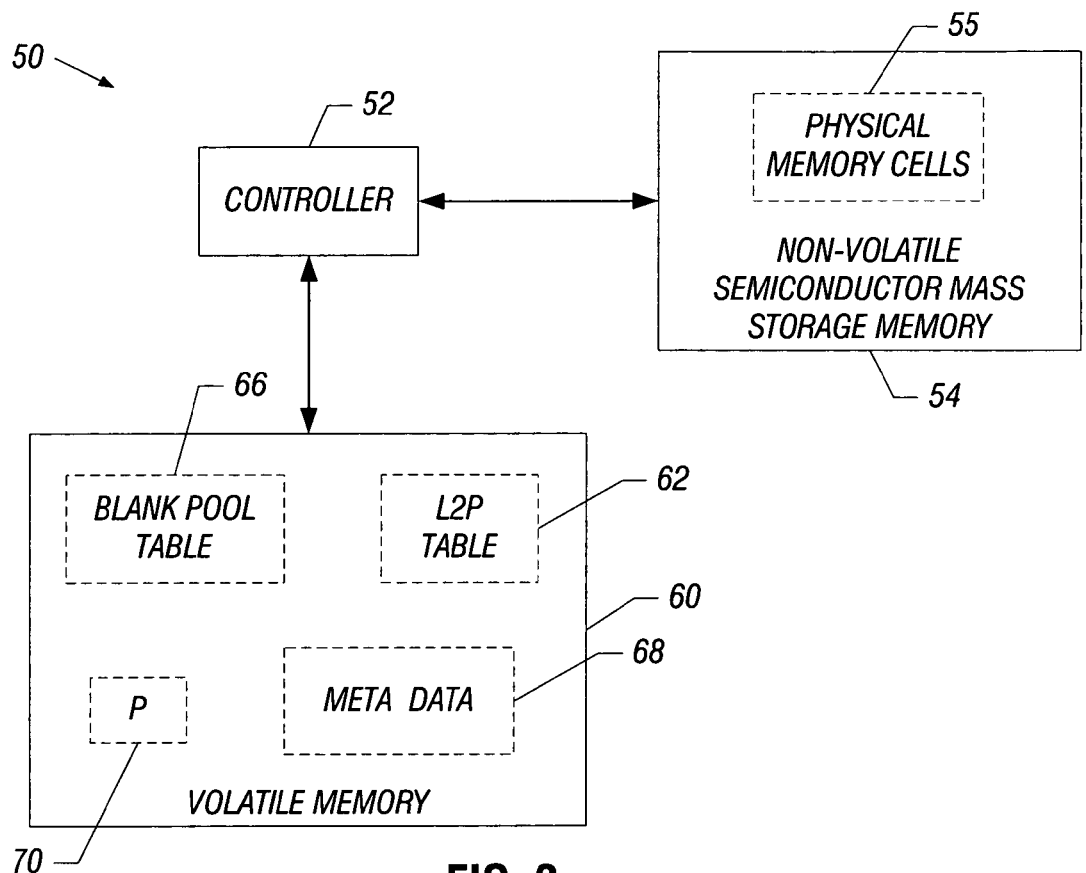
FIG. 2 is a block diagram of a memory system according to an embodiment of the invention.

Referring to FIG. 2, in accordance with some embodiments of the invention, a memory system 50 uses the above-described dynamic addressing scheme 10 and may be used in connection with a non-volatile semiconductor mass storage memory 54 (herein called the "non-volatile memory 54"), such as a NAND flash memory. The non-volatile memory 54 contains an array of physical memory cells 55 that are addressed using physical addresses. In accordance with some embodiments of the invention, a controller 52 of the memory system 50 performs dynamic addressing by converting between logical and physical address spaces. More specifically, in accordance with some embodiments of the invention, the controller 52 is coupled to a volatile memory 60, such as a dynamic random access memory (DRAM), for example. The volatile memory 60 stores a logical-to-physical translation table (herein called a "L2P table 62"), which the controller 52 uses for purposes of mapping the logical addresses to the physical addresses of the memory 54. This mapping continually changes, and thus, the controller 52 continually updates the L2P table 62 to track the remapping of each logical address to different physical addresses.

As also depicted in FIG. 2, in accordance with some embodiments of the invention, the volatile memory 60 stores a blank pool table 66, a table that indicates which of the physical addresses of the memory 54 are included in the blank pool 20 (see FIG. 1). Thus, when the controller 52 is to perform a write operation to a logical address, the controller 52, in general, selects an available physical address from the blank pool table 66, updates the L2P table 62 to remap the logical address to the selected physical address, and performs the corresponding write operation to the non-volatile memory 54 at the selected physical address.

Among the other data that may be stored in the volatile memory 60, in accordance with some embodiments of the invention, the volatile memory 60 may store meta data 68 that contains (among other possible information) information regarding the consumption state of the memory content that is stored at each physical address. In accordance with some embodiments of the invention, for each addressable location of the non-volatile memory 54, the meta data 68 indicates whether the data content that is stored in the location is used, valid or blank. In addition to the blank pool table 66, L2P table 62 and the meta data 68, the volatile memory 60 may store program instructions 70 that, when executed, cause the controller 52 to perform one or more of the physical write, address translation and power failure recovery techniques that are disclosed herein.

Thus, to summarize, the controller 52 uses the volatile memory 60 to store information that is indicative of the logical-to-physical address mapping and indicative of the states of the addressable memory locations of the non-volatile memory 54. It may be advantageous to store such information in the volatile memory 60, as compared to a non-volatile memory (such as the memory 54), due to the relatively faster access times to the volatile memory 60, given the high number of accesses used to maintain this information. The volatile information may be stored to non-volatile memory at key events, e.g., shutdown, hibernate, suspend, low power detection, etc., and restored therefrom on subsequent reboot/resume. However, in general, a potential challenge with this technique is that the information that is stored in the volatile memory 60 is lost in the event of a power failure to the memory system 50. Although periodic back-up of the contents of the volatile memory 60 may be made, these back-ups may be insufficient, by themselves, to recover the lost information. Therefore, upon recovery from a power failure, if not for features of the invention disclosed below, the controller 52 would be unaware of the logical-to-physical mapping and the consumption states of the various addressable memory locations of the volatile memory 54 and thus, would be unable to reconstruct the information that was stored in the volatile memory 60.

One possible technique that allows the controller 52 to reconstruct, or recover, the information that was stored in the volatile memory 60 prior to a power failure is a technique in which the controller 52 maintains all of the required state information in a non-volatile memory, such as the non-volatile memory 54. As a more specific example, to accomplish this, the controller 52 may perform two write operations to the non-volatile memory 54 for each logical write operation. More particularly, with this technique, the non-volatile memory 54 may be used to store current meta data state information to indicate whether a particular physical cell is currently valid or used. Therefore, for each logical write operation, the controller 52 may write to the newly-assigned physical address and write to previously-assigned physical address to mark that physical address as used. However, a potential difficulty with this arrangement is that two write operations to the non-volatile memory 54 are used for each single logical write operation, thereby increasing the write latency of the memory 54.

In accordance with embodiments of the invention described herein, the controller performs a single (instead of two, for example) write operation to the non-volatile memory 54 for each logical write operation. To permit recovery of the information (such as the information that is stored in the L2P table 62 and the blank pool table 66, for example) that is stored in the volatile memory 60 after a power failure, the controller 52, in each physical write operation, stores a sequence information, such as a time stamp or sequence number, in the non-volatile memory 54. More specifically, in accordance with some embodiments of the invention, the controller 52 generates a global sequence number for each write operation to the non-volatile memory 54. The controller 52 increments the global sequence number for each write operation so that the sequence number has an increasing value (for example) for the write operations. As described below, the sequence numbers are used by the controller 52 after a power failure to reconstruct the timeline of prior write operations (occurring before the power failure) to determine which addressable locations of the non-volatile memory 54 store valid data (and thus, also to determine which locations store used data).

Figure 3:
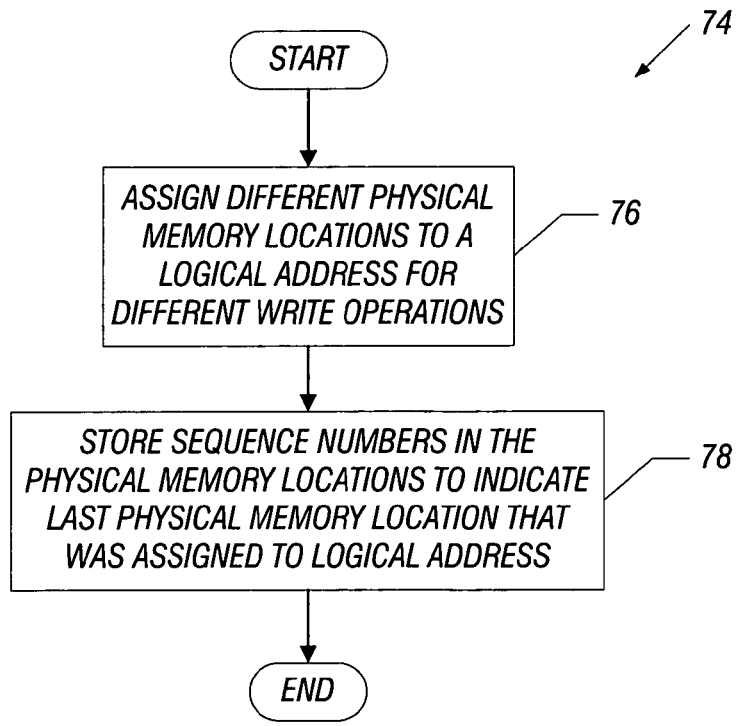
FIGS. 3 and 8 are flow diagrams depicting techniques used in connection with a write operation to a non-volatile semiconductor memory according to different embodiments of the invention.

Referring to FIG. 3, to summarize, in accordance with some embodiments of the invention, the controller 52 generally performs a technique 74 in connection with logical write operations. Pursuant to the technique 74, the controller 52 assigns (block 76) different physical memory locations to a logical address for different write operations. Thus, for a first write operation to a particular logical address, the controller 52 writes to a first physical address of the non-volatile memory 54; and for the next write operation to this logical address, the controller 52 writes to a second physical address of the non-volatile memory 54. Pursuant to the technique 74, the controller 52 stores (block 78) sequence numbers and logical addresses in the physical memory locations that collectively indicate the last physical memory location that was assigned to the logical address. As discussed above, the sequence numbers permit the controller 52 to rebuild the information in the volatile memory 60 after the occurrence of a power failure.

Figure 4:
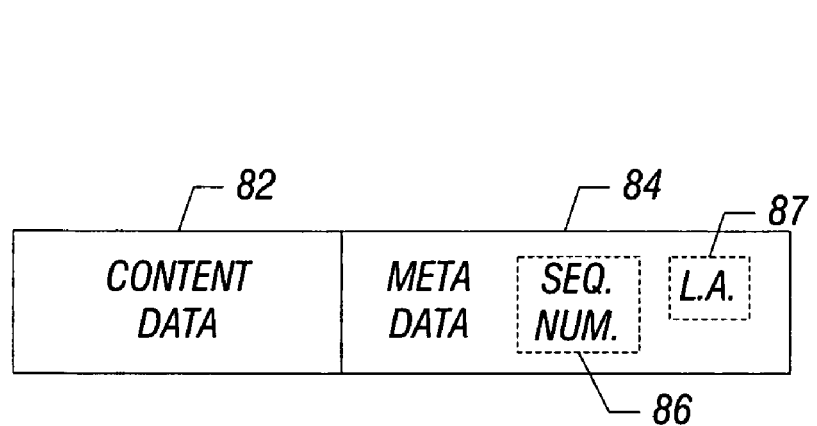
FIG. 4 is an illustration of data stored in a memory location of the non-volatile memory according to an embodiment of the invention.

FIG. 4 depicts exemplary data 80 that may be stored in each addressable memory location of the non-volatile memory 54 in accordance with some embodiments of the invention. The data 80 includes content data 82, which is the data that is the subject of the corresponding logical write operation. The data 80 also includes meta data 84 that includes various information regarding the state of the content data 82. Data fields 86 and 87 that indicate the sequence number logical address, respectively which are associated with the write operation to store the content data 82 may be part of the meta data 84. For applications in which the non-volatile memory 54 is used as a disk cache, the meta data 84 may include data regarding the status of the associated cache line. Thus, the meta data 84 may store other and/or different data than the exemplary data discussed herein.

Additionally, the meta data 84 may indicate the consumption state of the content data 82, such as whether the content data 82 is used or valid. However, the indicated consumption state may not be current because the controller 52 does not, for each logical write operation, mark the content at the physical address that was previously mapped to the logical address as being used. Therefore, several locations of the non-volatile memory 54 may contain meta data 84 that indicates the same logical address and indicates that the associated content data 82 is valid. The information that is contained in the volatile memory 60 is used by the controller 52 to sort out the valid data from the used data during normal operations; and in the event of a power failure, the controller 52 recovers the memory system 50 from the power failure by reading the sequence numbers from the non-volatile memory 54 to sort out the valid data from the used data and reconstruct the information that was previously stored in the volatile memory 60.

As noted above, the sequence numbers are global, in some embodiments of the invention, in that the sequence numbers are different for every write to the non-volatile memory 54, regardless of the logical address. However, in other embodiments of invention, a sequence number may only be unique to each logical address, and thus, the controller 52 may store sequence numbers (herein called "local sequence numbers") in the non-volatile memory 54 that each extend over the same range but are distinguished by associated logical addresses. Thus, it is possible, for example, that the non-volatile memory 54 stores a logical sequence number of "5" for logical address A and stores a logical sequence number of "5" for logical address D. A potential disadvantage of using local sequence numbers is that multiple counters are used to generate sequence numbers for the various logical addresses, instead of a single counter (for the global sequence number). However, a potential advantage of using local sequence numbers is that the corresponding data field size in the meta data 84 is smaller.

Figure 5:
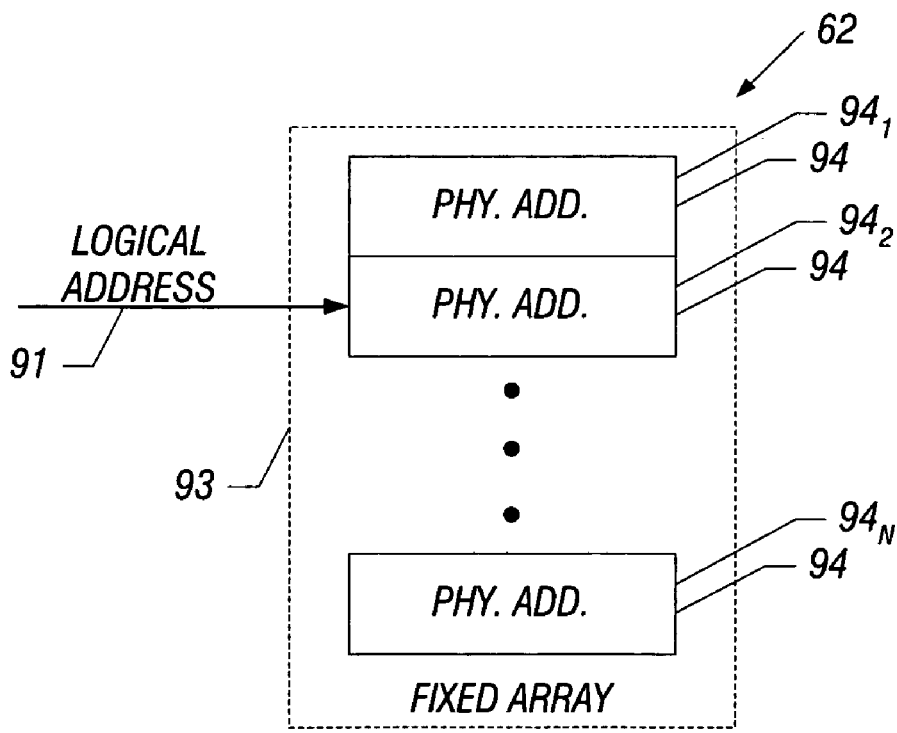
FIG. 5 is an illustration of a logical-to-physical translation table according to an embodiment of the invention.

FIG. 5 depicts the L2P table 62 in accordance with some embodiments of the invention. The L2P table 62 includes a fixed array 93 that includes N entries 94 (entries $94_1$, $94_2$ ... $94_N$, depicted as examples), each of which is associated with a particular logical address and stores an indication of a physical address for that logical address. Thus, the entries 94 of the fixed array 93 are indexed by a logical address pointer 91 for purposes of retrieving the current physical address for a particular logical address.

As described above, after data is stored in a particular physical address, the data stored in the corresponding memory location becomes used, and thus, the corresponding physical address becomes "invalid" for the logical address. Thus, in accordance with some embodiments of the invention, the entry 94 may store a predetermined value (such as a value of all "1's", for example) to indicate an invalid physical address. Alternatively, in accordance with some embodiments of the invention, the volatile meta data 68 may indicate which of the physical addresses are valid and used; and as yet another alternative, in some embodiments of the invention, the L2P table 62 may include a bit that is associated with each entry 94 to indicate whether the corresponding physical address is invalid or valid. Thus, many variations are possible and are within the scope of the appended claims.

Figure 6:
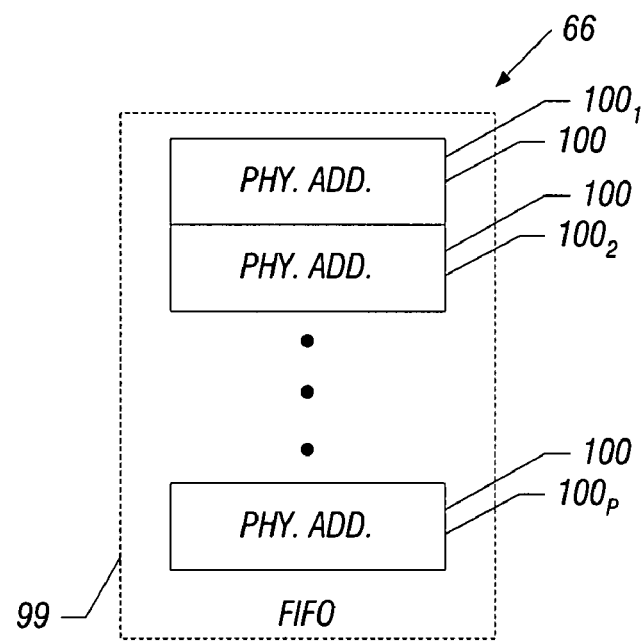
FIG. 6 is an illustration of a blank pool table according to an embodiment of the invention.

FIG. 6 depicts the blank pool table 66 in accordance with some embodiments of the invention. The blank pool table 66 includes P entries 100 (entries $100_1$, $100_2$ ... $100_P$, depicted as examples) each of which contains a physical address of a memory location that is part of the blank pool 20 (see FIG. 1). The P number of entries of the blank pool table 66 continually varies, as physical addresses are continually taken from the blank pool table 66 for new write operations and added to the blank pool table 66 after block erase operations. In accordance with some embodiments of the invention, the blank pool table 66 may include a first-in first-out (FIFO) buffer 99, or queue, (as an example) in which the entries 100 are added at one end of the FIFO buffer 99, and the entries are assigned to logical addresses at the other end of the buffer. Other arrangements are possible and are within the scope of the appended claims.

Figure 7:
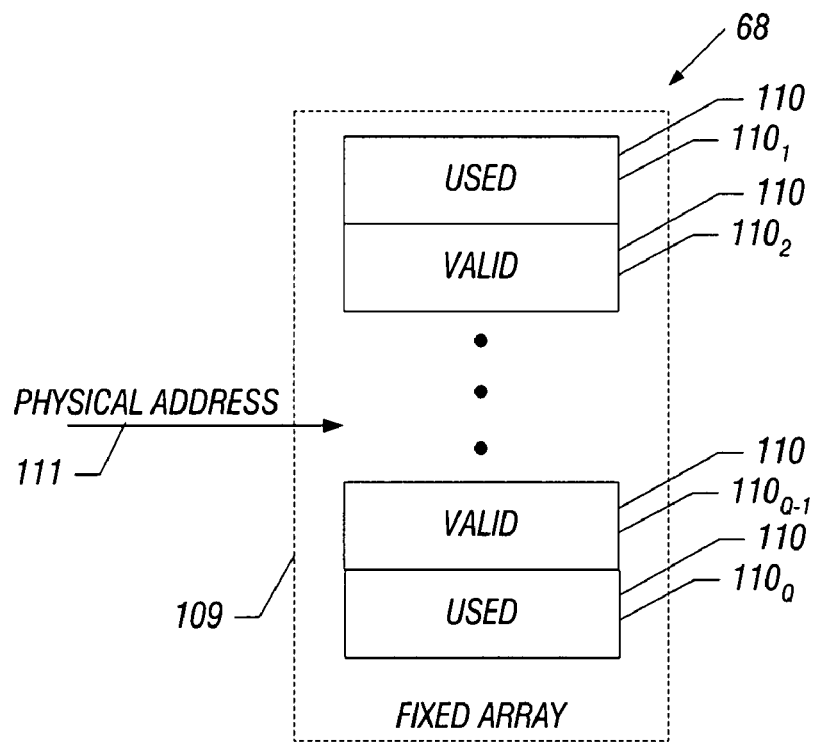
FIG. 7 is an illustration of volatile meta data according to an embodiment of the invention.

FIG. 7 depicts the volatile meta data 68 in accordance with some embodiments of the invention. The volatile meta data 68 may be arranged in the form of a fixed array 109 that includes Q entries 110 (entries $110_1$, $110_2$, ... $110_{Q-1}$, $110_Q$, depicted as examples), each of which is associated with one of the physical addresses of the non-volatile memory 54. Thus, the entries 110 may be indexed using a physical address pointer 111. As depicted in FIG. 7, each entry 110 may indicate whether the associated physical address contains used or valid data. Furthermore, in accordance with some embodiments of the invention, each entry 110 may indicate whether the associated physical address is associated with an erased, or blank, memory location. Thus, many variations are possible and are within the scope of the appended claims.

Figure 8:
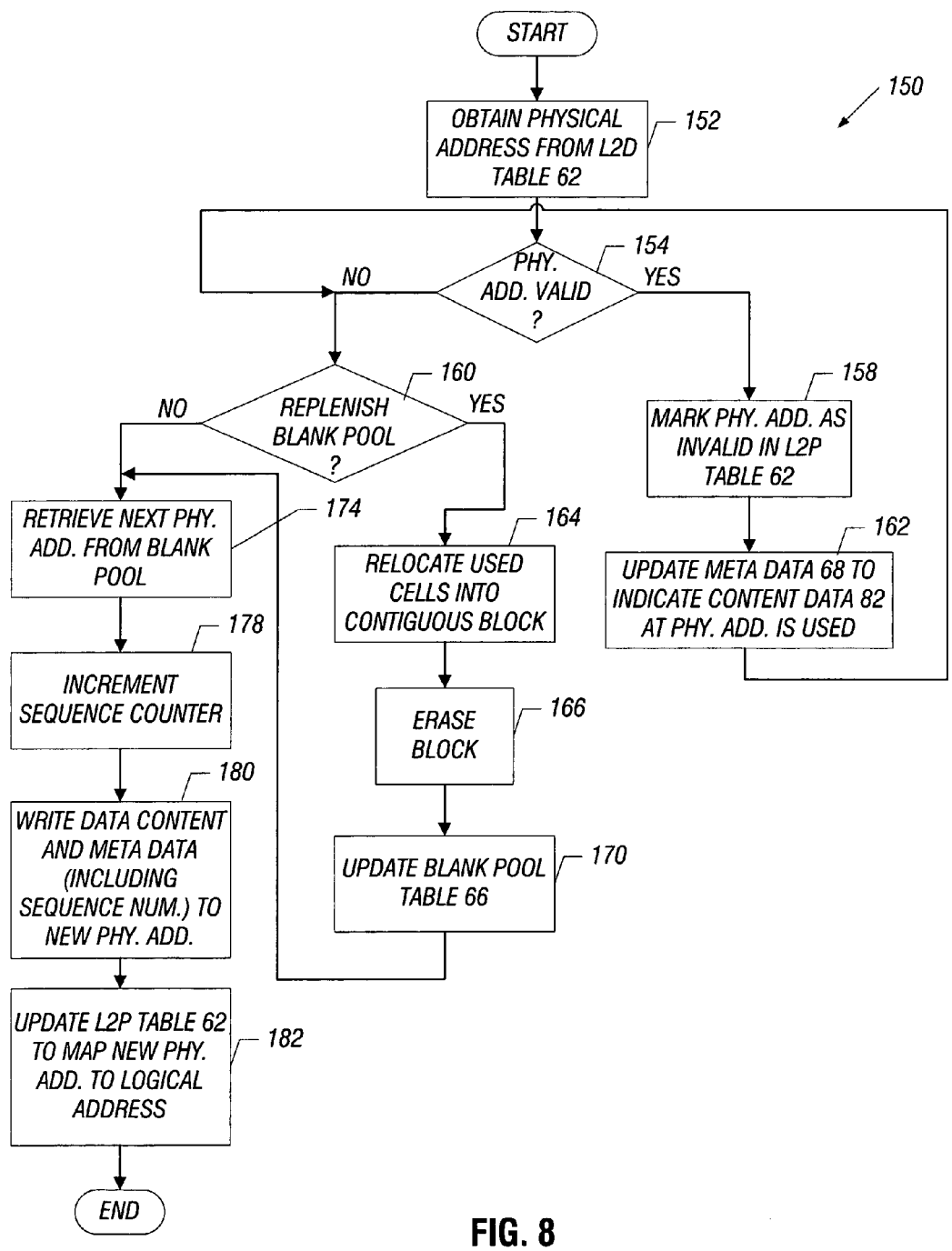

Referring to FIG. 8, the controller 52 (see FIG. 2) may generally perform a technique 150 in response to a logical write operation. The logical write operation targets a logical address and indicates data to be stored at the logical address. Pursuant to the technique 150, the controller 52 obtains a physical address for the logical address, such as by using the logical address to look up the particular physical address from the L2P table 62 (see FIG. 2), as depicted in block 152. The controller 52 then determines (diamond 154) whether the physical address is valid. This is quite often the case during normal operation, although a particular physical address may be associated with the blank pool after initial power up of the memory system 50 (see FIG. 2).

If the controller 52 determines (diamond 154) that the current physical address is valid, the controller 52 marks (block 158) the current physical address as invalid in the L2P table 62. Thus, if the current physical address currently stores valid data, pursuant to the dynamic addressing scheme discussed herein, another physical address is used (as described further below) to store the data that is the subject of the current logical write operation. Next, the controller 52 updates the volatile meta data 68 to indicate that the content data 82 (see FIGS. 2 and 4) at the current physical address.

Either after block 162 or after determining (diamond 154) that the current physical address is invalid, the controller 52 determines (diamond 160) whether it is time to replenish the blank pool 20. For example, in some embodiments of the invention, the controller 52 may monitor the number of physical addresses that make up the blank pool 20. Upon determining that this number has fallen below a predetermined threshold, the controller 52 may take actions to replenish the blank pool 20. For example, these actions may include relocating (block 164) used cells into a contiguous block. Thus, this relocation may involve moving addressable memory locations of the non-volatile memory 54 that are valid and used with associated updates to the volatile data 60. Once this contiguous block is established, the controller 52 erases the block, as depicted in block 166. Subsequently, the controller 52 updates (block 170) the blank pool table 66.

Regardless of whether the controller 52 replenishes the blank pool 20, the controller 52, pursuant to the technique 150, subsequently retrieves (block 174) the next physical address from the blank pool 20 (to replace the current physical address) and increments (block 178) a sequence counter. It is assumed for the embodiment discussed in connection with FIG. 8 that a global sequence counter is used. However, as discussed above, a separate local sequence counter may be used for each logical address, in accordance with other embodiments of the invention.

The controller 52 then writes (block 180) the content and meta data (which includes the sequence number and logical address) to the new physical address. Subsequently, the controller 52 updates (block 182) the L2P table 62 to map, or assign, the new physical address to the logical address.

Figure 9:
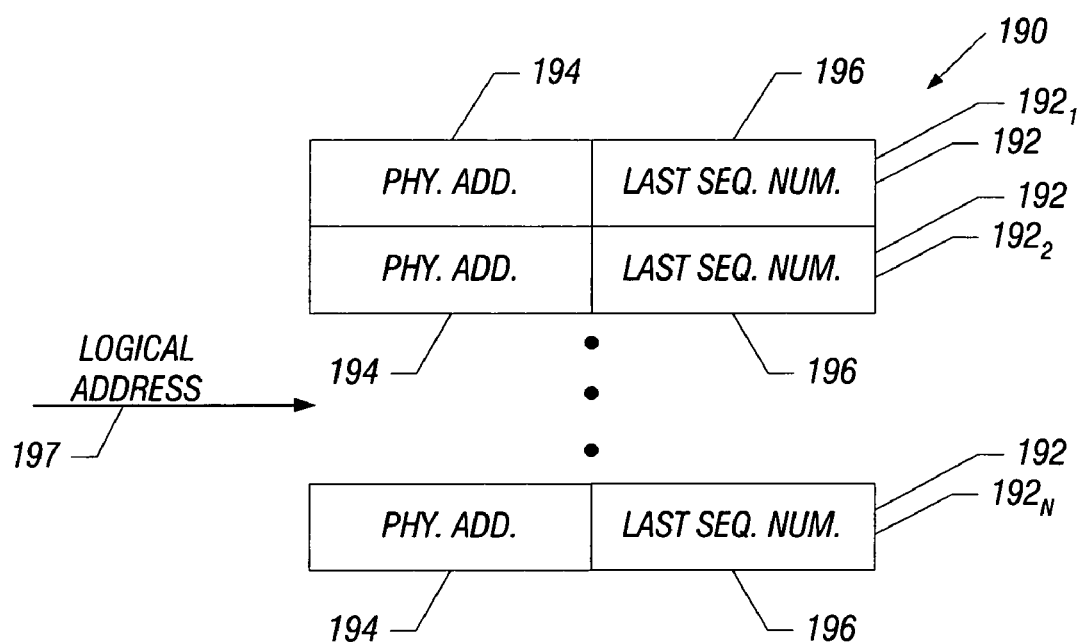
FIG. 9 is an illustration of an intermediate table used to reconstruct the logical-to-physical translation table after a power failure according to an embodiment of the invention.

For purposes of reconstructing the L2P table 62 after a power failure, the controller 52 uses a temporary table 190, an exemplary embodiment of which is depicted in FIG. 9. The table 190 includes N two tuple entries 192 (entries $192_1$, $192_2$, ... $192_N$, depicted as examples), each of which is associated with a particular logical address. Thus, the controller 52 may use a logical address pointer 197 for purposes of looking up a particular entry 192. In accordance with some embodiments of the invention, each entry 192 includes a field 194 that indicates a physical address for the logical address and a field 196 that indicates the last (and largest) sequence number that has been found so far. Therefore, the controller 52 updates the entries 192 as the controller 52 scans through the non-volatile memory 54 (after a power failure) so that at the end of the scan, each entry 192 indicates the most recently used physical address for each logical address (i.e., the physical address having the highest sequence number).

Figure 10:
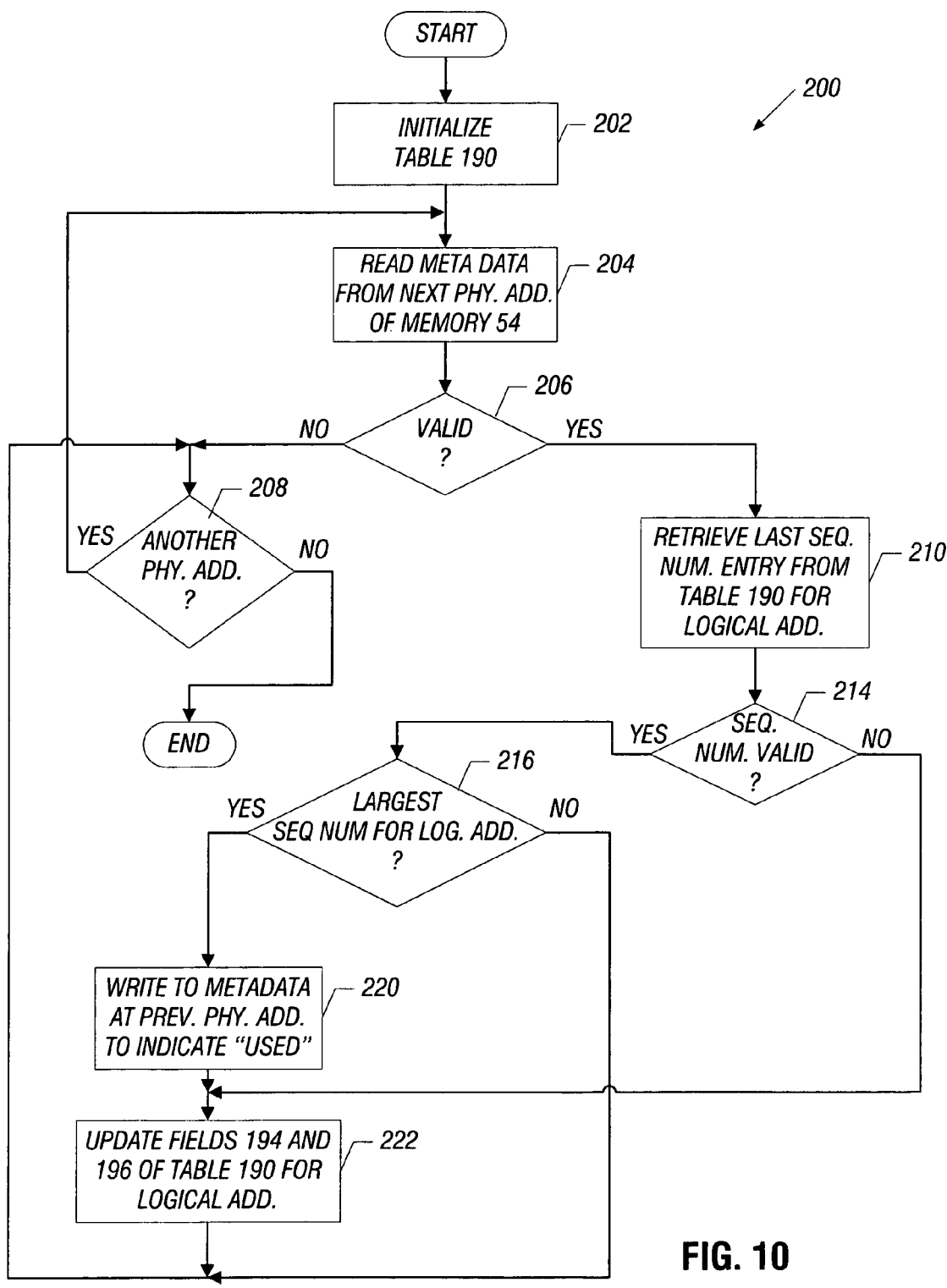
FIG. 10 is a flow diagram depicting a technique to reconstruct the logical-to-physical translation table after a power failure according to an embodiment of the invention.

As a more specific example of the use of the table 190, in accordance with some embodiments of the invention, the controller 52 generally performs a technique 200 that is depicted in FIG. 10. Pursuant to the technique 200, the controller 52 initializes (202) the table 190. For example, this initialization may include storing values (such as a "−1," for example) in each entry 192 (of the table 190) that do not correspond to a physical address or last sequence number, to indicate the initialized status of the entry 192. The controller 52 next reads (block 204) meta data from the next physical address of the non-volatile memory 54. If the meta data indicates that memory content is invalid, then the controller 52 determines (diamond 208) whether there is another physical address to process and if so, returns to block 204. Blank pool and used pool reconstruction may be done in the same pass, in accordance with some embodiments of the invention.

If the controller 52 determines (diamond 206) that the content data is valid, then the controller 52 retrieves (block 210) the last sequence number entry from the table 190 for the particular logical address that is associated with that physical address. Thus, an indication of this logical address is stored in the memory location of the non-volatile memory 54. If the controller 52 determines (diamond 214) that the sequence number is valid (i.e., the controller 52 determines that the sequence number is not the initialized value), then the controller 52 determines (diamond 216) whether the current sequence number is the largest sequence number for the logical address so far. If not, then control returns to diamond 208. Otherwise, the last physical address used for the logical address (as indicated so far in the scan) has been located, and the controller 52 writes (block 220) to the meta data at the previous physical address to indicate that the corresponding content data is "used." Subsequently, the controller 52 updates (block 222) the fields 194 and 196 (see FIG. 9) of the table 190 for the corresponding logical address. Control then proceeds to diamond 208 in which the controller 52 determines whether another physical address is to be processed. If not, then the controller 52 has completed the scan, and the table 190 has been constructed. It is noted that absent the entries 196 (see FIG. 9) the table 190 constitutes the reconstructed L2P table 62. Thus, in accordance with some embodiments of the invention, the controller 52 may extract the data 194 at the conclusion of the scan to reconstruct the L2P table 62.

Figure 11:
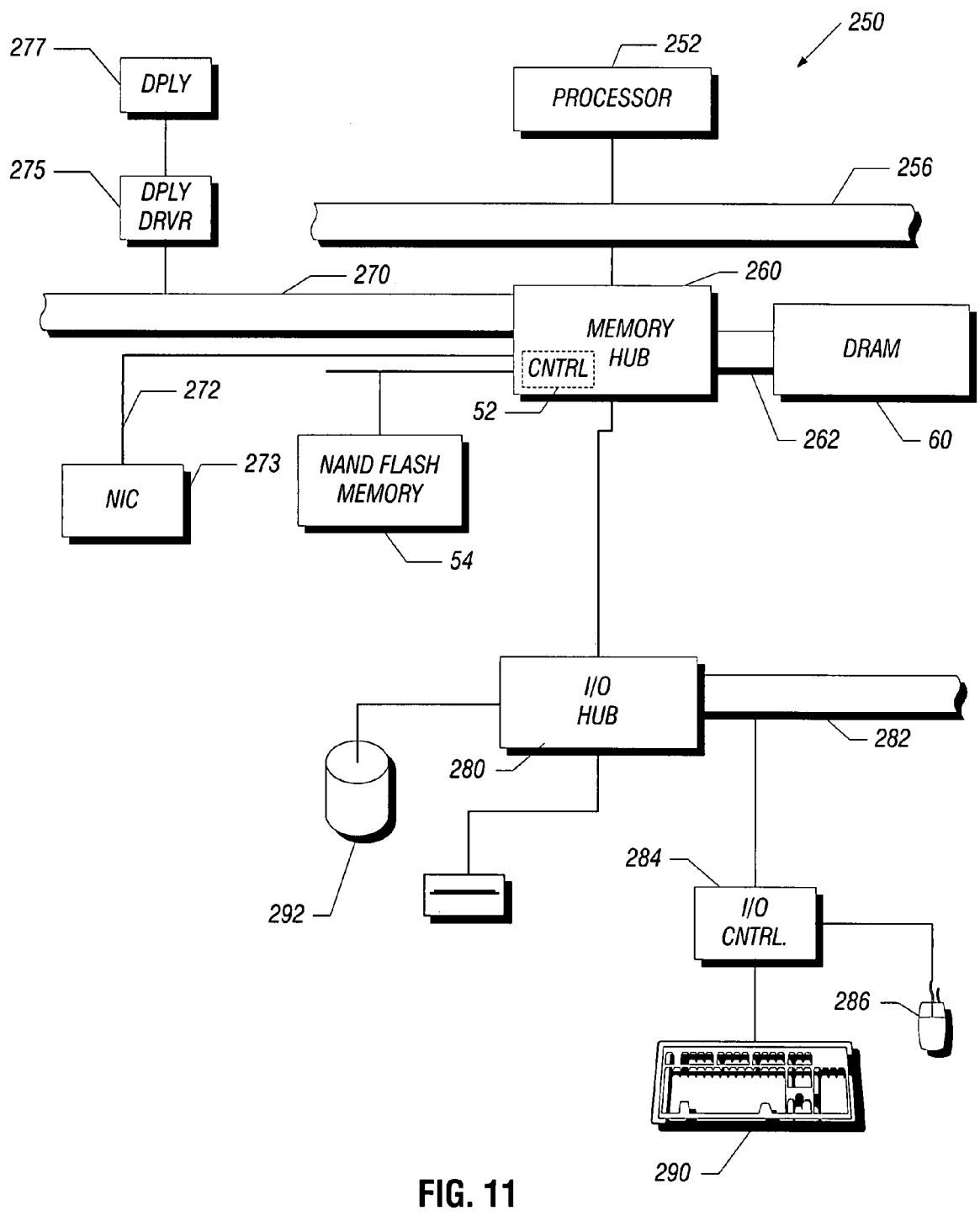
FIG. 11 is a block diagram of a computer system according to an embodiment of the invention.

The memory system 50 (see FIG. 2) may be used in a variety of different applications and thus, many different embodiments of the invention are possible and are within the scope of the appended claims. For example, in accordance with some embodiments of the invention, the memory system 50 may be a solid state disk, and in other embodiments of the invention, the memory system 50 may be a disk cache or a cache for multiple disks or RAID volumes. FIG. 11 depicts an exemplary embodiment of a computer architecture 250 that incorporates the memory system 50. The computer architecture 250 may be used in a desktop or laptop computer, as examples.

The computer system 250 includes a processor 252 (one or more microprocessors, for example) that is coupled to a system bus 256. The computer system 250 may also include a north bridge, or memory hub 260, that is coupled to the system bus 256 for purposes of establishing communication between the processor 252 and a system memory, such as a dynamic random access memory (DRAM) 60. In accordance with some embodiments of the invention, the DRAM 60 is an embodiment of the volatile memory 60, although other volatile memories may be used in other embodiments of the invention. The DRAM 60 may be coupled to the memory hub 260 via a memory bus 262. The memory hub 260 may include the controller 52 in some embodiments of the invention, although the controller 52 may be separate from the memory hub 260, in other embodiments of the invention.

As depicted in FIG. 11, in accordance with some embodiments of the invention, the non-volatile memory may be a NAND flash memory, although other types of non-volatile memory may be used in its place, in accordance with other embodiments of the invention. For example, in other embodiments of the invention, a ferro-electric polymer memory may be used in place of the NAND flash memory.

The memory hub 260 may interface other buses to the system bus 256, such as a Peripheral Component Interconnect (PCI) bus 272 and an Accelerated Graphics Port (AGP) bus 270, in some embodiments of the invention. The PCI Specification is available from The PCI Special Interest Group, Portland, Ore. 97214. The AGP is described in detail in the Accelerated Graphics Port Interface Specification, Revision 1.0, published on Jul. 31, 1996, by Intel Corporation of Santa Clara, Calif. The PCI bus 272 may couple, for example, a network interface card (NIC) 273 to the PCI bus 272; and the AGP bus 270 may couple, for example, a display driver 275 that drives a display 277 to the system bus 256.

As depicted in FIG. 11, in accordance with some embodiments of the invention, the memory hub 260 may be coupled to a south bridge, or an input/output (I/O) hub 280. The I/O hub 280 may provide interfaces for a CD-ROM drive 290 and a hard disk drive 292, as examples. Furthermore, the I/O hub 280 may provide an interface for an I/O expansion bus 282. An I/O controller 284 may be coupled to the I/O expansion bus 282 and may receive input data from a mouse 286 and a keyboard 290.

It is noted that the architecture that is depicted in FIG. 11 is merely for purposes of example, as other variations are possible and are within the scope of the appended claims.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   performing a plurality of write operations to store data in different physical memory locations, each of the physical memory locations being associated with a logical address shared in common among the physical memory locations;
   storing sequence information in each of the physical memory locations, the sequence information stored in each of the physical memory locations and comprising first data indicative of a sequence number to indicate which one of the write operations occurred last, second data to indicate whether the physical memory location contains valid data and third data to indicate whether the physical memory location is associated with a blank state; and
   in response to a power failure, using the sequence information to reconstruct a logical-to-physical translation table indicative of a mapping between the logical address and one of the physical memory locations, comprising:
      constructing a temporary table comprising a first entry indicative of one of the physical memory locations and a second entry indicative of the sequence number stored in said one physical memory locations; and
      comparing the sequence number stored in the physical memory location to the sequence number indicated by the second entry and selectively updating the first and second entries based on the comparison.

2. The method of claim 1, wherein the sequence information comprises one of a global sequence number, a local sequence number and a timestamp.

3. The method of claim 1, further comprising:
   storing the logical address in the physical memory locations to indicate which one of the write operations occurred last.

4. The method of claim 1, wherein each physical memory location stores a different version of data for the logical address.

5. The method of claim 1, further comprising:
   storing an indication of the logical address in each physical memory location.

6. The method of claim 1, wherein the physical memory locations are part of a non-volatile memory, the method further comprising:
   in response to each of the write operations, updating status information in a volatile memory to indicate which one of the physical memory locations stores valid data.

7. The method of claim 1, wherein the physical memory locations are part of a non-volatile memory, the method further comprising:
   in response to each of the write operations, updating a logical-to-physical address translation table indicative of a mapping between the logical address and one of the physical memory locations.

8. The method of claim 1, further comprising:
   in response to the power failure, using the sequence information to determine which of the physical memory locations do not store valid data for the logical address.

9. An apparatus comprising:
   a non-volatile memory; and
   a controller coupled to the memory to:
      perform a plurality of write operations to store data in different physical memory locations of the non-volatile memory, each of the physical memory locations being associated with a logical address shared in common among the physical memory locations; and
      store sequence information in each of the physical memory locations, the sequence information stored in each of the physical memory locations and comprising first data to indicate which one of the write operations occurred last, second data to indicate whether the physical memory location contains valid data and third data to indicate whether the physical memory location is associated with a blank state; and
      in response to a power failure, use the sequence information to reconstruct a logical-to-physical translation table indicative of a mapping between the logical address and one of the physical memory locations, the reconstruction comprising:
         constructing a temporary table comprising a first entry indicative of one of the physical memory locations and a second entry indicative of the sequence number stored in said one physical memory locations; and
         comparing the sequence number stored in the physical memory location to the sequence number indicated by the second entry and selectively updating the first and second entries based on the comparison.

10. The apparatus of claim 9, wherein the sequence information comprises one of a global sequence number, a local sequence number and a timestamp.

11. The apparatus of claim 9, wherein the controller stores the logical address in the physical memory locations.

12. The apparatus of claim 9, wherein each physical memory location stores a different version of data for the logical address.

13. The apparatus of claim 9, wherein the controller stores an indication of the logical address in each physical memory location.

14. The apparatus of claim 13, further comprising:
   a volatile memory,
   wherein the controller in response to each of the write operations, updates status information in a volatile memory to indicate which one of the physical memory locations stores valid data.

15. The apparatus of claim 13, further comprising:
   a volatile memory, wherein
   the controller in response to each of the write operations, updates a logical-to-physical address translation table indicative of a mapping between the logical address and one of the physical memory locations.

16. A system comprising:
   a non-volatile memory;
   a dynamic random access memory; and
   a controller to:
      use a logical-to-physical address translation table stored in the dynamic random access memory to perform a plurality of write operations to store data in different physical memory locations of the non-volatile memory, each of the physical memory locations being associated with a logical address shared in common among the physical memory locations;

store sequence information in each of the physical memory locations, the sequence information stored in each of the physical memory locations and comprising first data to indicate which one of the write operations occurred last, second data to indicate whether the physical memory location contains valid data and third data to indicate whether the physical memory location is associated with a blank state;

in response to a power failure, use the sequence information to reconstruct a logical-to-physical translation table indicative of a mapping between the logical address and one of the physical memory locations, the reconstruction comprising:

constructing a temporary table comprising a first entry indicative of one of the physical memory locations and a second entry indicative of the sequence number stored in said one physical memory locations; and comparing the sequence number stored in the physical memory location to the sequence number indicated by the second entry and selectively updating the first and second entries based on the comparison.

17. The system of claim 16, wherein the controller in response to a power failure, uses the sequence information to reconstruct the logical-to-physical address translation table.

18. The system of claim 16, wherein the controller in response to a power failure, uses the sequence information to determine which of the physical memory locations do not store valid data for the logical address.

19. An article comprising a computer accessible storage medium storing instructions to, when executed, cause the computer to:

perform a plurality of write operations to store data in different physical memory locations, each of the physical memory locations being associated with a logical address shared in common among the physical memory locations;

store sequence information in each of the physical memory locations, the sequence information stored in each of the physical memory locations and comprising first data to indicate which one of the write operations occurred last, second data to indicate whether the physical memory location contains valid data and third data to indicate whether the physical memory location is associated with a blank state;

in response to a power failure, use the sequence information to reconstruct a logical-to-physical translation table indicative of a mapping between the logical address and one of the physical memory locations, the reconstruction comprising:

constructing a temporary table comprising a first entry indicative of one of the physical memory locations and a second entry indicative of the sequence number stored in said one physical memory locations; and comparing the sequence number stored in the physical memory location to the sequence number indicated by the second entry and selectively updating the first and second entries based on the comparison.

20. The article of claim 19, the storage medium storing instructions to, when executed, cause the computer to store an indication of the logical address in each physical memory location.

21. The article of claim 19, the storage medium storing instructions to, when executed, cause the computer to in response to each of the write operations, update status information in a volatile memory to indicate which one of the physical memory locations is currently associated with the logical address.

22. The article of claim 19, wherein the physical memory locations are part of a non-volatile memory, the storage medium storing instructions to, when executed, cause the computer to in response to each of the write operations, update a logical-to-physical address translation table indicative of a mapping between the logical address and one of the physical memory locations.

23. The article of claim 19, the storage medium storing instructions to, when executed, cause the computer to in response to a power failure, use the sequence information to determine which of the physical memory locations do not store valid data for the logical address.

24. The article of claim 19, the storage medium storing instructions to, when executed, cause the computer to in response to a power failure, use the sequence information to determine which of the physical memory locations are erased.

* * * * *